US006222562B1

(12) United States Patent
Leidich

(10) Patent No.: US 6,222,562 B1
(45) Date of Patent: Apr. 24, 2001

(54) FAST PROCESSED SCREEN IMAGE

(75) Inventor: Russell Merritt Leidich, Mountain View, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/102,563

(22) Filed: Jun. 23, 1998

(51) Int. Cl.[7] .................................................... G06F 13/00

(52) U.S. Cl. ........................................... 345/511; 345/132

(58) Field of Search .................................... 345/508, 509, 345/511, 501, 522, 132, 507

(56) References Cited

U.S. PATENT DOCUMENTS

| | | | |
|---|---|---|---|
| 4,816,815 | 3/1989 | Yoshiba | 340/750 |
| 5,446,840 | 8/1995 | Kiuchi et al. | 395/164 |
| 5,640,574 | 6/1997 | Kawashima | 395/750 |
| 5,751,979 * | 5/1998 | McCrory | 345/343 |
| 5,777,624 * | 7/1998 | Munson | 345/431 |

FOREIGN PATENT DOCUMENTS 0 684 058 A1 11/1995 (EP) .

* cited by examiner

*Primary Examiner*—Kee M. Tung
(74) *Attorney, Agent, or Firm*—Irell & Manella LLP

(57) ABSTRACT

A display process for displaying predetermined image data in a computer that includes a processor, a fast memory, and a video system having a video memory, comprising the steps of: during a computer execution period, writing contents from a block of the fast memory to a first memory, the fast memory having an access time which is less than an access time for the video memory; writing predetermined image data into the block of the fast memory; processing the predetermined image data from the fast memory; and writing the processed predetermined image data to the video memory.

12 Claims, 3 Drawing Sheets

FAST PROCESSED SCREEN IMAGE

FIELD OF THE INVENTION

Briefly, the present invention is directed to the field of screen image processing, and more particularly, to the field of screen image processing optimized for fast execution.

BACKGROUND OF THE INVENTION

There is currently no suitable system available for providing fast image processing to allow the immediate display of a predetermined image while a computer user is waiting for the completion of execution of-a computer operation. By way of example, but not by way of limitation, a saved-to-non-volatile-memory command will require a significant amount of time to complete its required function, while the user waits in front of the screen. This execution period for the computer presents an opportunity to display predetermined images such as, for example, advertising, or other desired images to the user. However, typical images, such as screen saver images, which are displayed on the computer, are not optimized for fast execution and are not programmed to be displayed during the period when the computer is executing a program routine. Thus, current systems are not designed to take advantage of this opportunity for displaying predetermined images to the user.

SUMMARY OF THE INVENTION

Briefly, the present invention comprises, in one embodiment, a display process for displaying predetermined image data in a computer that includes a processor and a video system having a video memory, with the video system having at least one video mode, with each video mode designating a portion of the video memory as a visible portion and another portion as a non-visible portion, comprising the steps of: after a save-in-non-volatile-memory command, selecting a video mode with at least a predetermined amount of video memory in the non-visible portion; writing contents from a block of a fast memory to the non-visible portion of the video memory, the fast memory having an access time that is less than an access time for the video memory; writing the predetermined image data into the block in the fast memory; processing the predetermined image data from the fast memory; and writing the processed predetermined image data to the video memory.

In a further aspect of the present inventive process, the fast memory comprises a main memory for the computer.

In a yet further aspect of the present inventive process, the selecting step comprises the step of selecting a video mode with substantially the same resolution as a display screen for the computer.

In a yet further aspect of this process, the selecting step further comprises the step of selecting a video mode with at least a 15 bit color depth.

In yet another aspect of the present invention, the selecting step further comprises the step of choosing a video mode that is compatible with the predetermined image data.

In a yet further aspect of the present invention, the block of fast memory is divided into at least a first buffer memory and a second buffer memory; wherein the writing in the fast memory step comprises the step of writing data from the predetermined image data alternately into the buffer memories; and wherein the processing step comprises the step of processing in parallel with the buffer writing step the predetermined image data from one of the buffer memories that is not being written to.

In a yet further aspect of the present invention, a display process is disclosed for displaying predetermined image data in a computer that includes a processor, a fast memory, and a video system having a video memory, comprising the steps of: during a computer execution period, writing contents from a block of the fast memory to a first memory, the fast memory having an access time which is less than an access time for the video memory; writing the predetermined image data into the block in the fast memory; processing the predetermined image data from the fast memory; and writing the processed predetermined image data to the video memory.

In a further aspect of this process, a step is provided of selecting a video mode for the video system which has predetermined characteristics. This step of selecting a video mode may comprise, in one embodiment, the step of selecting a video mode with at least a predetermined amount of the video memory having a non-visible portion; and wherein the step of writing contents from the block of fast memory comprises the step of writing to the non-visible portion of the video memory.

In a yet further aspect of the present invention, an article of manufacture is provided comprising: a computer usable medium having computer readable program code means embodied therein for causing a computer with a video system to display predetermined image data during a computer execution period, the computer readable code means in the article of manufacture comprising: first computer readable program code means for causing a computer, during a computer execution period, to write contents from a block of a fast memory to a first memory, wherein the fast memory has an access time that is less than an access time for a video memory in the video system in the computer; second computer readable program code means for causing a computer to write the predetermined image data into the block of the fast memory; third computer readable program code means for causing the computer to process the predetermined image data from the fast memory; and fourth computer readable program code means for causing the computer to write the processed predetermined image data to the video memory.

In a further aspect of this article of manufacture, the video memory is divided into a visible portion and a non-visible portion, and wherein the first computer readable program code means includes code for writing the contents from the block of the fast memory to the non-visible portion of the video memory.

DETAILED DESCRIPTION OF THE PREFERRED EMBODIMENT

The present invention is designed to provide fast image processing to display a predetermined image quickly on a display during a period in which a computer is executing a program routine, i.e., a computer execution period. By way of example, during a save-to-disk command, the screen is typically idle, with only an unscaled progress bar with a maximum of four simultaneous colors (this color selection must remain constant for at least three seconds in current designs) displayed from the save-to-disk command. This computer execution period presents an opportunity to display predetermined image data, such as advertising, to the user with a color count of more than four simultaneous colors with change cycles of under three seconds. However, typical image programs designed to operate under screen idle conditions are not optimized for fast execution and are not operating system independent. In particular, during save-to-disk commands, it is essential that the predetermined image display be operating system-independent and require no operating system functionality. But screen saver programs are typically dependent on operating system functionality.

In the example of the save-to-disk command, any display of a predetermined image occurs during a system save state, so that it is not possible to use the operating system to determine if any memory is available in main memory for work space to process the predetermined image for display. In contrast, screen saver programs do not have a problem with obtaining memory for image processing because such programs can allocate memory through the operating system, like other normal application programs.

Figure 1A:
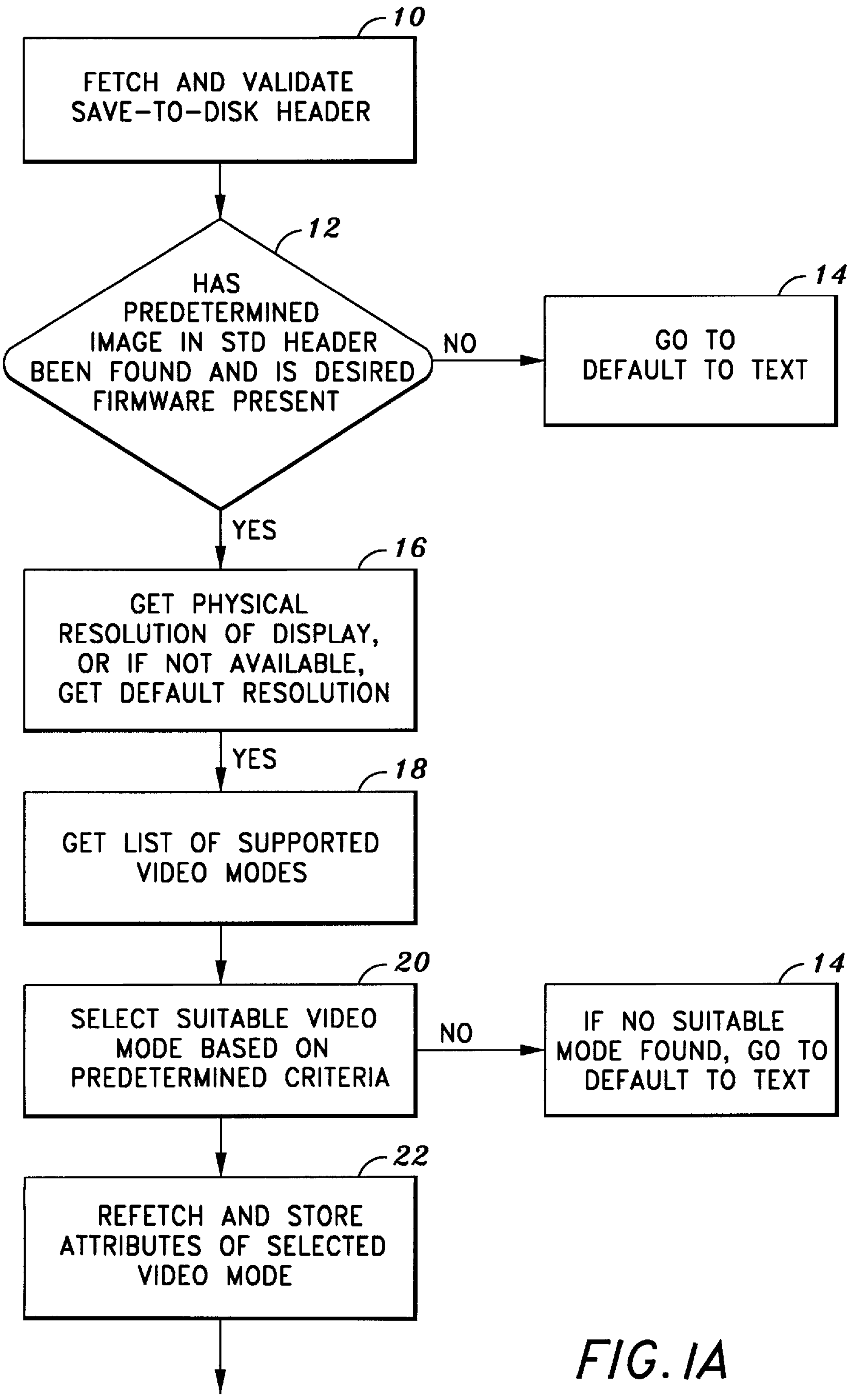
FIGS. 1A, 1B and 1C is a flowchart of a preferred embodiment of the present invention.
Figure 1B:
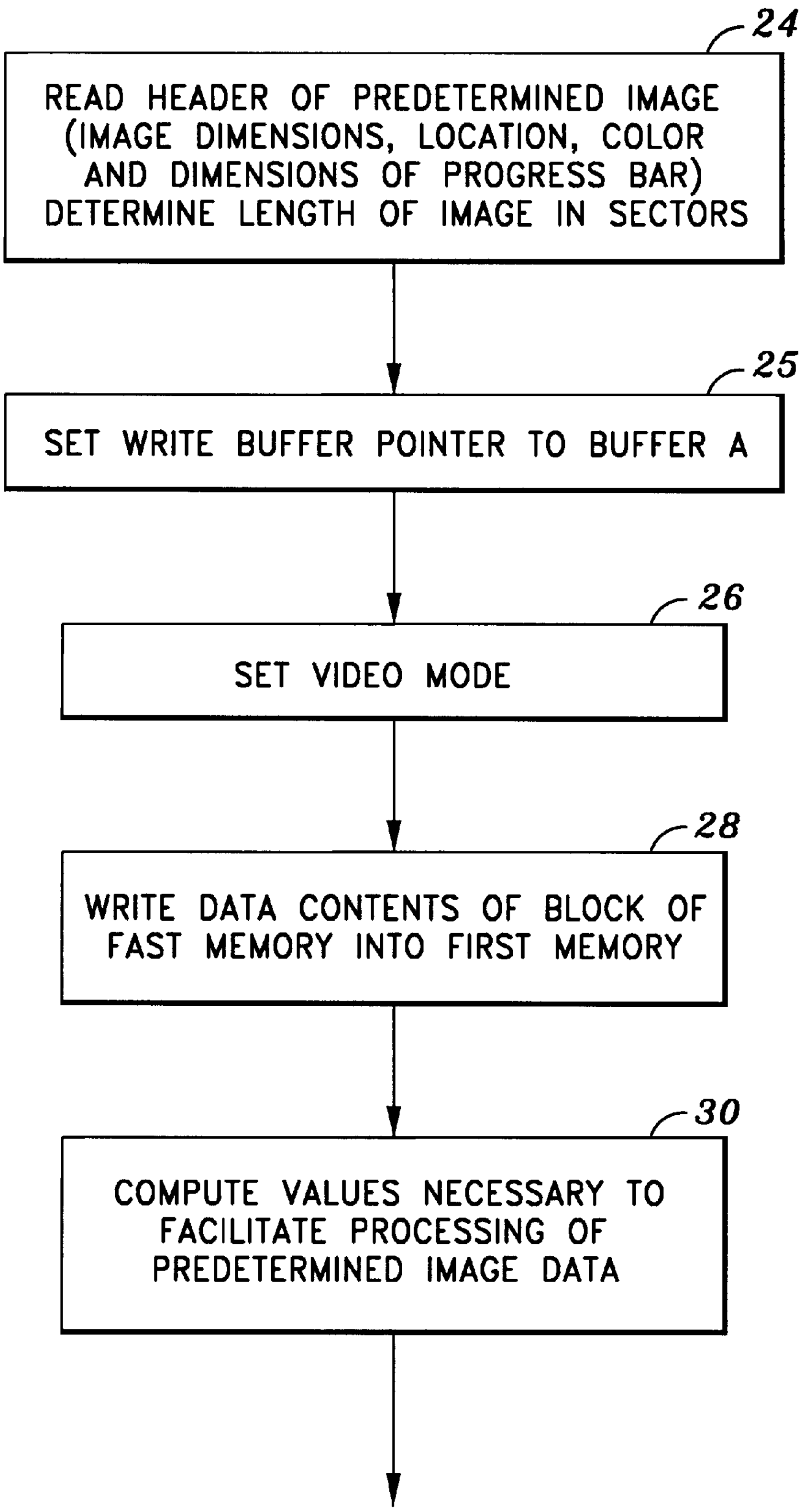
Figure 1C:
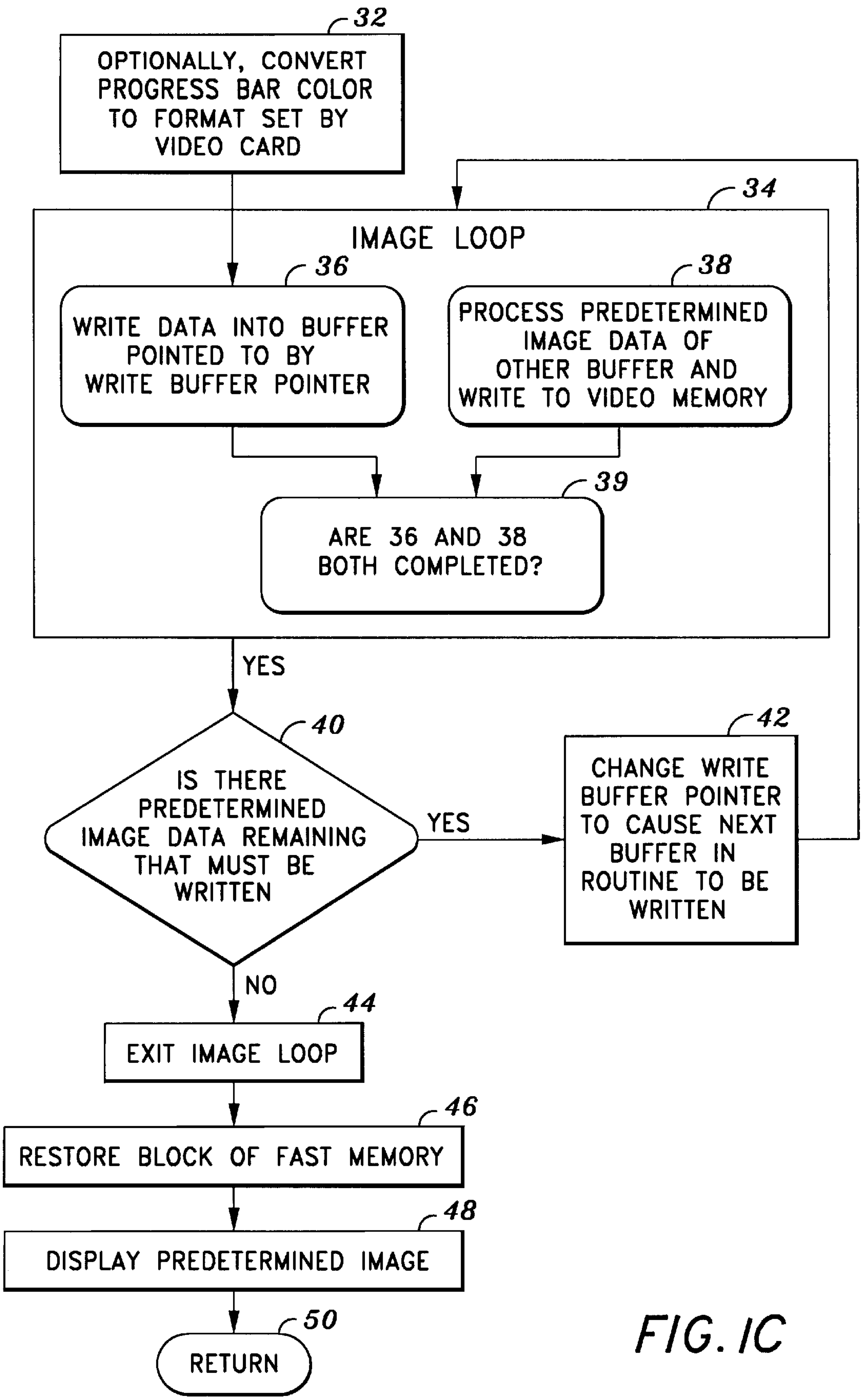

Referring now to FIG. 1A, 1B and 1C a preferred embodiment of the present invention is described. In the first step at block 10 of the program, a computer execution period is recognized. In the context of a Save-To-Disk command, the header sector for the Save-To-Disk command is fetched and validated. The purpose of this validation is to determine if a predetermined graphic image is present, and if so, where this predetermined image is located in memory space. Typically, predetermined image data will be located on a hard drive, but it could be stored at a variety of different memory locations or could even be accessed through a network.

The next step at block 12 is to determine whether a predetermined image in the Save-To-Disk header has been found. If no predetermined image has been located, then the program goes to the Default To Text block 14. This Default To Text block simply displays predetermined text on the screen in a well known manner.

Additionally, at block 12 the execution will also look to determine whether desired video firmware is present in the system. Although a variety of different firmware may be utilized, in a preferred embodiment, the desired firmware is VESA (Video Electronics Standards Association) firmware and is located on a video card for the system. Note that the video firmware may also be in the BIOS or on the motherboard for the computer or in some other convenient location. The VESA firmware is preferably version 2.0 or greater. If the desired video firmware is not present in the system, then the program sends the execution to the Default To Text block 14.

The next step in the program at block 16 is to obtain the physical screen resolution of the pertinent display. Typically, this physical resolution will be obtained through the VESA firmware. If the VESA firmware cannot return this information, then a default resolution is provided. By way of example, but not by way of limitation, a default resolution of 640×480 may be provided.

The next step in the program at block 18 is to obtain a list of supported video modes. This may be typically obtained through the VESA firmware.

The next step at block 20 is to select a suitable video mode based on predetermined criteria set in the program. In one embodiment, to be discussed in detail below, where information and data content held in a fast memory block is to be stored in the video memory for the video system, a predetermined portion of non-visible memory is desired to be present. Accordingly, in that embodiment, the first predetermined parameter in the predetermined criteria is a predetermined amount of non-visible memory being present in a video mode. In a preferred embodiment, the non-visible memory criteria is set to at least 64k of non-visible memory. The next predetermined criteria, or the first predetermined criteria if a non-visible memory criteria is not present, is to select a video mode which has a resolution which is compatible with the physical display resolution determined previously. In a preferred embodiment, the predetermined criteria for the video mode resolution is set equal to the physical resolution of the display.

The next predetermined criteria is to select a video mode with a preferred color depth. The preferred color depth will depend on the particular application and the number of colors desired. In a preferred embodiment, the color depth is set to either 15 or 16 bits.

A further predetermined criteria for the video mode is to set the pixel format to be compatible with the pixel format of the predetermined image data. If the predetermined image data is RGB data, then it is preferred that the video mode selection be an RGB video mode. In general, the following order or preference for pixel format is preferred: 5 Red, 6 Green, 5 Blue (5R6G5B), 5B6G5B, 5R5G5B, or 5B5G5R.

In essence, the operation that is taking place is that the program is talking to the video firmware on the video card (not to the operating system) and is searching for a video mode that is optimal based on the size of the non-visible memory (an optional first criteria), the resolution of the video mode, the color depth for the video mode and the pixel format for the video mode. In one embodiment, the program serially compares each available video mode to a preferred set of predetermined criteria and stores the first video mode which meets these predetermined criteria. The program continues to query the video firmware on the video card for new video modes until all of the video modes have been reviewed. When a video mode is found which more closely fits the predetermined criteria than the video mode currently stored, then this new video mode replaces the stored video mode.

It should be noted that it is preferred that the video memory be linearly writable.

This linear writability permits the program to talk directly to the video memory, bypassing the firmware on the video card. In essence, if the video memory is linearly writable, then writing can be accomplished in one continuous burst. If the video memory is not linearly writable, then the data will typically be passed by means of packets through a paging mechanism.

If no suitable video mode is found during this step, then the program goes to block 14, the Default To Text block.

The next step in the present embodiment of the invention is to re-fetch and store the attributes of the selected video mode. This is accomplished in block 22.

The next step in the program at block 24 is to read the header of the predetermined image, which contains information on the dimensions of the predetermined image, as well as the location, dimensions, and color of a progress bar. The progress bar provides information to the user on what proportion of the program executing during this period has been completed. Note that the use of a progress bar is optional with the program designer. Also during this program step, the sector length of the image is computed. The size of the visible portion of the video memory is determined also at this time. If this program is for an X86 processor, then the program switches into the flat mode. Also, in a preferred embodiment the first location of the non-visible portion of the video memory is determined and saved. The determination of this first location of the non-visible memory is obtained by taking the video memory base address and adding the size of the visible portion of the video memory thereto.

In the next step in the program at block 25, if a block of fast memory is to be organized by this program into a plurality of buffers, as is done in a preferred embodiment of the present invention, then a write buffer pointer A is set to buffer A. The next step in the program at block 26 is to set the video mode for the video memory, based on the video mode selected in step 20.

The next step at block 28 is to free-up a block of fast memory for use in processing the predetermined image data. This is accomplished by writing the data contents of a selected block of a fast memory into a first memory. Note that this step is necessary because the system is operating system independent and cannot access the operating system to determine what memory is free. By way of example, this first memory is not main memory but could simply be memory disposed in the firmware in the system, or it could be memory disposed in any peripheral device such as a sound driver, or printer driver, or it could be flash memory generally, or it could be memory accessed via the internet or some other network. In a preferred embodiment, this first memory comprises the non-visible portion of the video memory. The non-visible portion of the video memory is preferred due to speed considerations. Note that typically the amount of memory necessary in the first memory will be 64k or larger.

The fast memory could be implemented in the present invention by means of any fast memory having an access time greater than the video memory. Preferred access times for a fast memory are on the order of 10 nanoseconds or less access time. However, fast memories could operate in accordance with the present invention with access times of 80 nanoseconds or less. The fast memory of the present invention could be implemented by a cache memory. However, in a preferred embodiment of the present invention, the fast memory has been implemented by main memory.

The next step is block 30 in the program which computes various scaling values necessary to perform horizontal and vertical scaling of the predetermined image. A divisor-remainder method may be used to meet requirements for spatial consistency on the scaling. Note that if the predetermined image size is identical to the display screen size, then scaling may not be necessary. Note that any scaling parameters determined will be used not only on the predetermined image data, but also preferably on any progress bar dimensions.

The next step at block 32 is to convert the progress bar color to the format set by the video card if a progress bar is to used. The next step in the program at block 34 is to enter an image write and process loop. This block 34 could simply be implemented by a single buffer into which predetermined image data is written. The data in this single buffer would then be processed by the CPU of the computer and the resulting processed data written to the video memory. However, in a preferred embodiment, multiple buffers are utilized to increase speed. In this preferred embodiment, there is a block 36 in the image loop block 34, wherein data from the predetermined image is written into a one of a plurality of buffers which is pointed to by the write buffer pointer. The next step in this loop is to process the data in the buffer just written to, while writing new data from the predetermined image data into another of the plurality of buffers. However, in a preferred embodiment shown in the figure, parallel processing is accomplished at block 38, by processing the predetermined image data held in another buffer in the plurality of buffers during the write step into the write pointer designated buffer. The processing of the predetermined image data comprises scaling of the predetermined image data to the screen display size, if the predetermined image is larger or smaller than the screen display physical size, as well as pixel multiplexing the predetermined data. This pixel multiplexing, in some instances, comprises shifting the predetermined image data so that it is congruent with the pixel format for the screen display. Processing may also entail scanline tracking and testing for the end of the buffer. This processing is accomplished by calling a BIOS disk read function which then passes control to a background processing routine after sending the read command to the hard disk. When the hard disk has finished the read, it will then notify the background routine, which will then pass control back to the BIOS disk routine and then finally back to the image loop. This processed data is then written to the visible portion of the video memory. When both the Write function of block 36 into one buffer and the Process function of block 38 for the other buffer have been completed, as determined in block 39, then the program execution proceeds to block 40.

At block 40 the program determines whether there is predetermined image data remaining that must be written to the buffers. If the answer is yes, then the program execution proceeds to block 42 wherein the write buffer pointer is caused to change to the next buffer to be written to. In a system with only buffers A and B, the write buffer pointer, which initially pointed to buffer A, would be changed to point to buffer B, and the next portion of data from the predetermined image would be written into the buffer B. At the same time, the data in buffer A would be processed by the CPU of the computer in execution block 38.

As noted above, in a preferred embodiment, the processing of the data occurring in execution block 38 may occur simultaneously with the writing of the predetermined image data into the next buffer. This parallel processing significantly speeds the execution of the program. Note that because the fast memory has an access time which is substantially faster than the access time for the video memory, a processing in the CPU for the computer may be accomplished substantially faster than if data was being accessed from the video memory or other memory.

If the determination in block 40 is that there is no image data remaining to be written, then the execution of the program proceeds to block 44 which exits the image loop. The next step in the program is block 46 which restores the data contents to the block of fast memory. In the preferred embodiment of the present invention, the data stored in the non-visible portion of the video memory is restored to the block of main memory which had been utilized as the fast memory in that embodiment.

The next step in this program is block 48 wherein the predetermined image is displayed on the display screen. Note that the predetermined image may be displayed at the time that the video memory is written to at block 48, if that is desired. The program then returns to the main program at block 50.

It can be seen that high speed processing is achieved in accordance with the present invention by writing predetermined image data that is to be displayed into a fast memory for processing. This writing function is accomplished in a preferred embodiment by writing alternately into a set of buffers in this block of fast memory. In a more preferred embodiment, the predetermined image data is processed in one buffer, while new data from the predetermined image is being written into another buffer. For the example of a buffer A and a buffer B, the program would write predetermined image data into one of the buffers while processing the predetermined image data in the other of the buffers. The processed data is then written into the video memory and the predetermined image is displayed.

In a preferred embodiment, this predetermined image data is typically deep-color, high resolution uncompressed image data from a disk. The present inventive design permits the display of this deep-color image as quickly as possible while the user of the computer is waiting for another program which is executing on the system, such as a saveto-disc program, to be completed.

In one especially preferred embodiment of the present invention, a portion of the predetermined image data is written into the fast memory in parallel with the processing of a different portion of the predetermined image data, to substantially increase the display process speed. In essence, the process is processing one buffer while the other buffer is being written to. This program is operating system independent and requires no operating system functionality. The present invention uniquely uses VESA BIOS firmware calls and video graphics modes with more color displayed simultaneously using, for example, fifteen-bit or sixteen-bit pixels (32K or 64K simultaneous colors).

It should be understood that the exact sequence of steps described above is not essential and that various of the steps could be interchanged or equivalent steps substituted while still accomplishing the objects of fast processing and operating system independence.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalent.

We claim:

1. A display process for displaying predetermined image data in a computer that includes a processor and a video system having a video memory, with the video system having at least one video mode, with each video mode designating a portion of said video memory as a visible portion and another portion as a non-visible portion, comprising the steps of:

after a save-in-non-volatile-memory command, selecting a video mode with at least a predetermined amount of video memory in said non-visible portion;

writing contents from a block of a fast memory to said non-visible portion of said video memory, said fast memory having an access time that is less than an access time for said video memory;

writing said predetermined image data into said block of said fast memory;

processing said predetermined image data from said fast memory;

writing said processed predetermined image data to said video memory.

2. A method as defined in claim 1, wherein said fast memory comprises a main memory for said computer.

3. A method as defined in claim 2, wherein said process is initiated on a save-to-disk type command.

4. A method as defined in claim 2, wherein said step of writing contents from a fast memory is operating system independent.

5. A method as defined in claim 1, wherein said video memory in said method steps is a linearly writable memory.

6. A method as defined in claim 1, wherein said selecting step comprises the step of selecting a video mode with substantially the same resolution as a display screen for said computer.

7. A method as defined in claim 6, wherein said selecting step further comprises the step of selecting a video mode with at least a 16 bit color depth.

8. A method as defined in claim 7, wherein said selecting step further comprises the step of choosing a video mode that is compatible with said predetermined image data.

9. A method as defined in claim 1, wherein said processing step comprises the step of scaling the predetermined image to a display screen of said computer.

10. A method as defined in claim 1, wherein said block of said fast memory is divided into at least a first buffer memory and a second buffer memory;

wherein said writing in said fast memory step comprises the step of writing data from said predetermined image data alternately into said buffer memories; and wherein said processing step comprises the step of processing in parallel with said buffer writing step said predetermined image data from one of said buffer memories that is not being written to.

11. A method as defined in claim 1, wherein writing said predetermined image data step and said processing step are performed partially in parallel.

12. A display process for displaying predetermined image data in a computer that includes a processor, a fast memory, and a video system having a video memory, comprising the steps of:

during a computer execution period, writing contents from a block of said fast memory to a non-visible portion of the video memory, said fast memory having an access time which is less than an access time for said video memory;

writing said predetermined image data into said block of said fast memory;

processing said predetermined image data from said fast memory;

writing said processed predetermined image data to said video memory; and selecting a video mode for said video system having predetermined characteristics with at least a predetermined amount of said video memory having a non-visible portion;

wherein said step of writing contents from said block of said first memory comprises the step of writing to said non-visible portion in said video memory.

* * * * *